US010530230B2

(12) United States Patent
Hayward et al.

(10) Patent No.: US 10,530,230 B2
(45) Date of Patent: Jan. 7, 2020

(54) MINIATURE LINEAR VIBROTACTILE ACTUATOR (71) Applicants: UNIVERSITE PIERRE ET MARIE CURIE (PARIS 6), Paris (FR); CENTRE NATIONAL DE LA RECHERCHE SCIENTIFIQUE, Paris (FR)

(72) Inventors: Vincent Hayward, Paris (FR); Amir Berrezag, Antony (FR); George Dietz, Newtonville, MA (US)

(73) Assignees: SORBONNE UNIVERSITE, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 958 days.

(21) Appl. No.: 14/366,572

(22) PCT Filed: Dec. 19, 2012

(86) PCT No.: PCT/EP2012/076230
§ 371 (c)(1),
(2) Date: Jun. 18, 2014

(87) PCT Pub. No.: WO2013/092760
PCT Pub. Date: Jun. 27, 2013

(65) Prior Publication Data
US 2014/0346901 A1 Nov. 27, 2014

(30) Foreign Application Priority Data
Dec. 19, 2011 (FR) ...................................... 11 61874

(51) Int. Cl.
*H02K 33/00* (2006.01)
*H02K 15/14* (2006.01)
(Continued)

(52) U.S. Cl.
CPC ............. *H02K 33/00* (2013.01); *H02K 15/06* (2013.01); *H02K 15/14* (2013.01); *H02K 33/02* (2013.01);
(Continued)

(58) Field of Classification Search
CPC .... H02K 41/031; H02K 41/033; H02K 33/16; H02K 33/00; H02K 15/14; H02K 15/06; H02K 35/00; H02K 35/02; H02K 33/02
(Continued)

(56) References Cited

U.S. PATENT DOCUMENTS 5,434,549 A * 7/1995 Hirabayashi ........... H02K 33/00
335/229
5,896,076 A 4/1999 Van Namen
(Continued)

FOREIGN PATENT DOCUMENTS

EP 0 580 117 A2 1/1994
JP 2003-174759 A 6/2003
(Continued)

OTHER PUBLICATIONS

JP2011247249A (English Translation).*
International Search Report for PCT/EP2012/076230 dated Mar. 4, 2014.

*Primary Examiner* — Mang Tin Bik Lian
*Assistant Examiner* — Alexander Moraza
(74) *Attorney, Agent, or Firm* — Sughrue Mion, PLLC (57) ABSTRACT

The invention relates to a miniature linear vibrotactile actuator comprising: a first element 14, 104 of generally cylindrical shape, comprising permanent magnets 15, 105 aligned so that two adjacent sides of two adjacent magnets 15, 105 have identical polarities; a second element 11, 101 defining a cylindrical cavity 12, 102 into which the first element 14, 104 is inserted with play so as to be able to slide
(Continued)

therein in a sliding direction X2, the second element 11, 101 comprising coils 13, 103 of conductive wire having strands that extend perpendicularly to the sliding direction X2, in order to form magnetic force generators, and that are placed so as to be able to influence the first element 14, 104 electromagnetically; and means 25, 41, 125 for returning and guiding the first element 14, 104 toward an equilibrium position in the second element 11, 101, in which position a median plane P2 between two adjacent magnets substantially coincides with a median plane P1 of a facing force generator 111.

16 Claims, 5 Drawing Sheets

(51) Int. Cl.
*H02K 15/06* (2006.01)
*H02K 33/02* (2006.01)
*H02K 33/16* (2006.01)

(52) U.S. Cl.
CPC ......... *H02K 33/16* (2013.01); *Y10T 29/49009* (2015.01)

(58) Field of Classification Search
USPC ....... 310/12.24, 12.25, 12.26, 12, 14, 15, 25
See application file for complete search history.

(56) References Cited

U.S. PATENT DOCUMENTS

| | | | | |
|---|---|---|---|---|
| 5,945,749 | A * | 8/1999 | Li | H02K 7/1884 290/42 |
| 2011/0239383 | A1 * | 10/2011 | Nishiura | A61C 17/3445 15/22.1 |
| 2013/0026279 | A1 * | 1/2013 | Agrikli | B65H 54/2833 242/476.7 |

FOREIGN PATENT DOCUMENTS

| | | | |
|---|---|---|---|
| JP | 2009-090482 | A | 4/2009 |
| JP | 2011247249 | A * | 12/2011 |

* cited by examiner

MINIATURE LINEAR VIBROTACTILE ACTUATOR

CROSS REFERENCE TO RELATED APPLICATIONS

This application is a National Stage of International Application No. PCT/EP2012/076230 filed Dec. 19, 2012, claiming priority based on French Patent Application No. 11 61874, filed Dec. 19, 2011, the contents of all of which are incorporated herein by reference in their entirety.

The invention relates to a miniature linear vibrotactile actuator and a production method for such an actuator.

BACKGROUND OF THE INVENTION

Miniature vibrotactile actuators are used in a very large number of industrial applications, in particular in the field of haptic interfaces, which allow a human being to receive a piece of information transmitted by a machine by perceiving a tactile sensation.

Among those haptic interfaces, force-feedback haptic interfaces which are used in particular in virtual reality devices provide a user with a tactile sensation corresponding to the one which would be felt in a simulated environment by the device. There are a large number of applications: video games, driving or flight simulation, simulation of surgery, etc.

Other haptic interfaces are used only for transmitting a warning to a user, for example, in the case of a vibrating element of a mobile telephone or a tactile tablet, for example.

A major issue in the development of those applications is the miniaturization of the vibrotactile actuators. These actuators transform an electrical signal, which is generated by any machine (computer, mobile telephone, etc.), into a vibrating signal which is perceptible by touching it. That miniaturization must be accompanied by an amplitude of vibrations which is as great as possible. The frequencies intended are those of the tactile range, between 20 Hz and 1000 Hz.

When a permanent magnet technology is selected in order to produce a linear vibrotactile actuator (in place of a piezoelectric technology, for example), it is particularly advantageous to use a so-called "non-ferrous" actuator. Those actuators comprise a mobile element which does not have any device for channeling magnetic field lines and which comprises at least one permanent magnet, and a fixed element which comprises at least one electrical coil in which an electric current flows. A force produced by the electric current and by a magnetic field produced by the permanent magnet generates a linear movement of the movable element in relation to the fixed element.

The main advantages of this type of actuator are:
a reduced spatial requirement,
the great weight of the movable element in relation to the fixed element, which allows the production of great accelerations, and therefore powerful vibrations,
a small number of elements which form the actuator, which allows the cost thereof to be reduced.

The miniaturization of this type of actuator poses a given number of technical problems. In particular, it is difficult to produce a uniform magnetic field which has great intensity without any device for channeling field lines.

Figure 1:
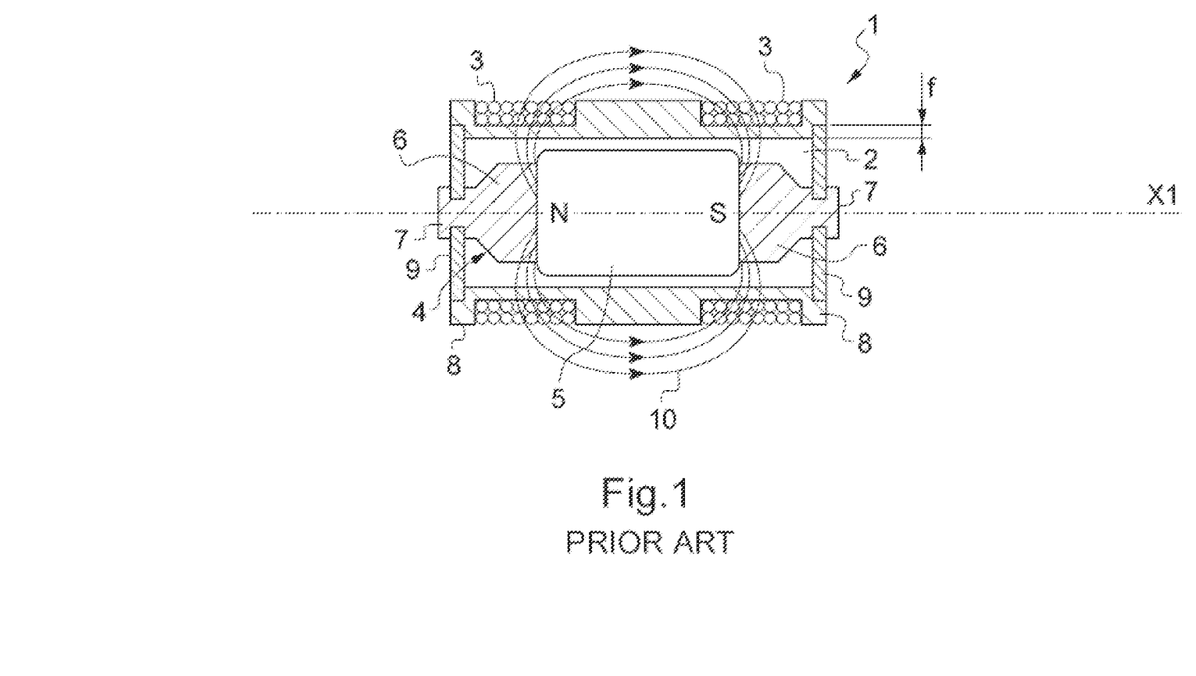

In order to illustrate this difficulty, a vibrotactile actuator of the prior art is illustrated in FIG. 1. The vibrotactile actuator of the prior art comprises a tubular body 1 which defines a cylindrical cavity 2 having an axis X1. The body 1 comprises two electrical coils 3 of conductive wire which are arranged coaxially relative to the axis X1 and are offset axially in order to surround the cylindrical cavity 2.

The vibrotactile actuator of the prior art further comprises an axisymmetrical movable fitting 4 which is inserted with little play inside the cylindrical cavity 2 in order to be able to slide inside it. The movable fitting 4 substantially comprises a permanent magnet 5 whose outer casing defines the cylindrical shape of the movable fitting 4 and which has North (N), South (S) axial polarities so that the magnetic field generated by the permanent magnet 5 has cylindrical symmetry. The permanent magnet 5 is in this instance fixedly joined to two supports 6 which extend at one side and the other of the permanent magnet 5 in order to have ends 7 which are connected to ends 8 of the body 1 by resilient diaphragms 9 which form a return means of the movable fitting 4 towards a position of equilibrium inside the body 1 without any power supply from the electrical coils 3. The resilient diaphragms 9 further bring about the sealing of the inner side of the cylindrical cavity 2. Field lines 10 of the permanent magnet 5 in the plane of section are illustrated in FIG. 1. When the electrical coils 3 are supplied with an alternating electric current, Laplace forces are applied to the electrical coils 3, inducing opposing forces which act on the movable fitting 4 in order to bring about the alternating linear movement thereof in the body 1. The alternating accelerations to which the movable fitting 4 is subjected during its alternating movement produce the vibrations generated by the vibrotactile actuator of the prior art.

In the Figure, it may be noted that the field lines of the permanent magnet 5 are not mutually parallel when they extend through the electrical coils 3, so that the magnetic field generated by the permanent magnet 5 is not uniform beside the electrical coils 3. Furthermore, only some of the field lines 10 extend radially beside the electrical coils 3 so that the intensity of the electromagnetic force induced is not at a maximum.

OBJECT OF THE INVENTION

An object of the invention is to overcome the disadvantages described above by providing a miniature linear vibrotactile actuator capable of generating great vibrations in the range of tactile frequencies (20 Hz-1000 Hz) or greater in the acoustic range. The invention also relates to a production method for such an actuator.

BRIEF DESCRIPTION OF THE INVENTION

In order to achieve this object, there is provided a miniature linear vibrotactile actuator comprising:
a first element of generally cylindrical form comprising permanent magnets which are aligned in such a manner that two adjacent faces of two adjacent magnets have identical polarities;
a second element which defines a cylindrical cavity in which the first element is introduced with play in order to slide therein in a sliding direction, the second element comprising conductive wire coils having strands which extend perpendicularly to the sliding direction in order to form magnetic force generators and which are arranged to be in a state of electromagnetic influence with the first element;
return and guiding means for the first element in a direction towards a position of equilibrium in the second element for which a center plane between two adjacent magnets substantially coincides with a center plane of a facing force generator.

That configuration of permanent magnets allows the production of a substantially uniform magnetic field with radial symmetry, whose magnetic field lines are concentrated at the location of the force generators and extend radially in the region thereof, which allows maximization of the intensity of the electromagnetic force induced by supplying the force generators with power.

The invention also relates to a production method for an actuator as described above. This method comprises at least:
- a step of positioning the conductive wire coils on a core,
- a step of inserting the electrical coils and the core in a mold,
- a step of injecting a material into the mold,
- a step of hardening the material,
- a step of removing the second element which is formed by a portion of the hardened material and which comprises the coils,
- a step of destroying or removing the core,
- a step of inserting the first element inside the second element.

Other features and advantages of the invention will be appreciated from a reading of the description below of a specific non-limiting embodiment of the invention.

BRIEF DESCRIPTION OF THE DRAWINGS

In addition to FIG. 1 which illustrates the prior art and which has already been described above, reference will be made to the Figures of the appended drawings, in which.

DETAILED DESCRIPTION OF THE INVENTION

Figure 2:
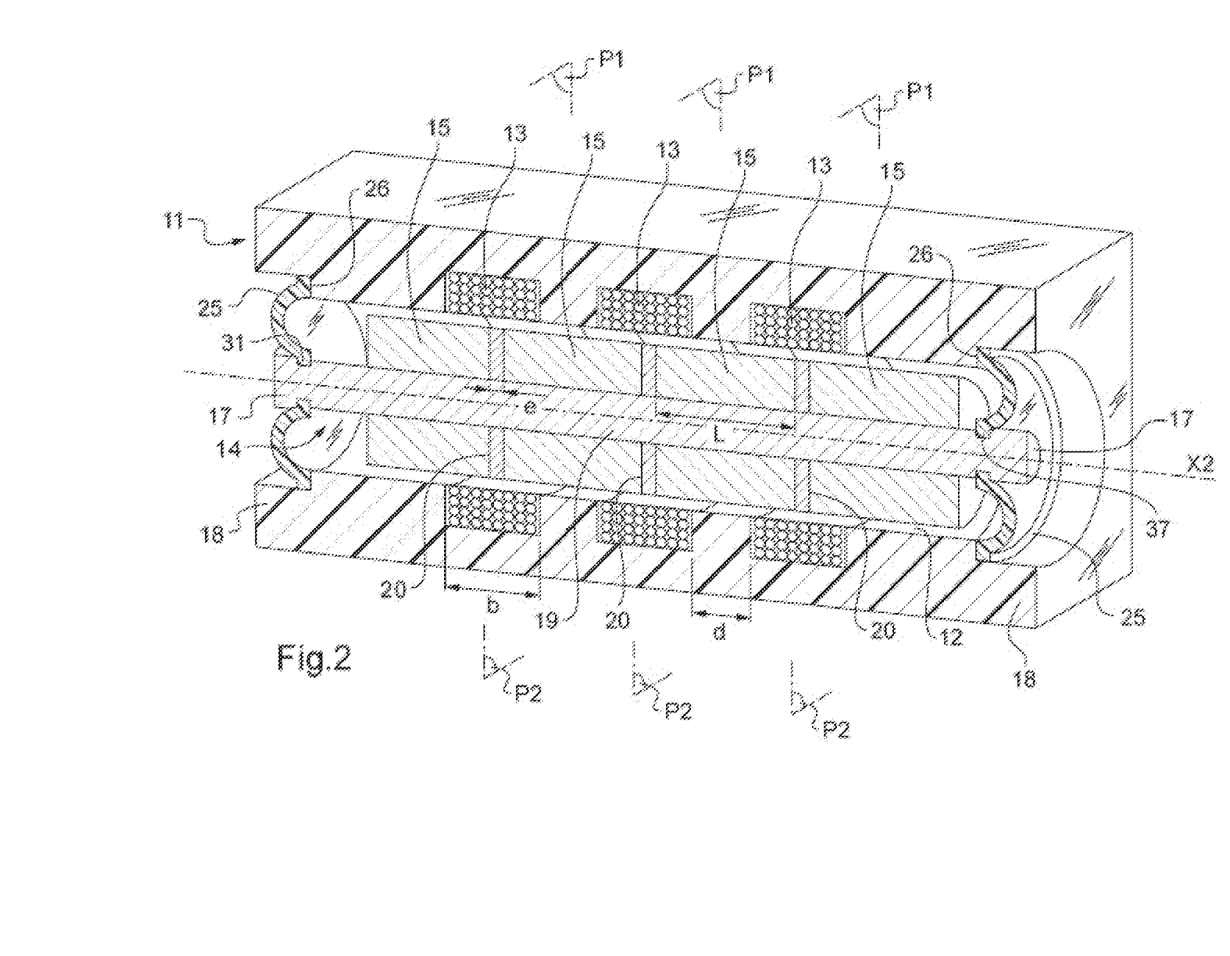
FIG. 2 is a perspective cross-section of a miniature linear vibrotactile actuator having permanent magnets in accordance with a first embodiment of the invention.

With reference to FIG. 2, the miniature linear vibrotactile actuator having permanent magnets according to the invention illustrated comprises a body 11 which defines a cylindrical cavity 12 which has a circular cross-section and an axis X2. The body 11 in this instance comprises three conductive wire coils 13 which are arranged coaxially relative to the axis X2 and which are offset axially in order to surround the cylindrical cavity 12. The coils are in this instance embedded in a polymerizable resin which forms the body 11. In this instance, each of the coils 13 defines a magnetic force generator in which the conductive wire which constitutes the coil extends perpendicularly to the sliding direction X2 (to within the winding angles of the conductive wire). In this instance, the assembly of the conductive wire constituting each of the coils forms strands which extend perpendicularly to the sliding axis and which together form a force generator. For each coil, and therefore each force generator, it is possible to define a center plane P1 perpendicular to the sliding axis X2, which center plane extends substantially through the center of the generator.

The actuator of the invention further comprises a cylindrical movable fitting 14 which is inserted with little play inside the cylindrical cavity 12 in order to be able to slide inside it. The movable fitting 14 comprises in this instance four tubular permanent magnets 15 which are juxtapositioned and orientated in such a manner that two opposing faces of two adjacent magnets have identical polarities (North-North or South-South). The permanent magnets 15 are maintained in an aligned state by a rod 19 which is constructed from non-magnetic material, for example, from brass. The rod 19 is inserted in central recesses of the permanent magnets 15. The permanent magnets 15 are separated by washers 20 which are also constructed from a magnetically permeable or soft ferromagnetic material, for example, from soft iron.

The position of the coils 13, which in this instance surround the permanent magnets 15, allows effective discharge of the heat produced by the dissipation of the energy by the Joule effect which is produced when a current flows in the conductive wire of the coils 13, having a non-zero resistance.

Ends 17 of the rod 19 of the movable fitting 14 are connected to ends 18 of the body 11 by resilient diaphragms 25 which guide the movable fitting 14 during the sliding thereof in the cavity 12 of the body 11 and which form a return means for the movable fitting 14 in the direction towards an equilibrium position inside the body 11, without any power being supplied to the coils 13.

As for the actuator of the prior art described above, the coils 13 being supplied with an alternating current is what allows the production of the Laplace forces on the coils 13 which induces opposing forces which act on the movable fitting 14 in order to bring about the alternating linear movement thereof in the body 11 at one side and the other of the equilibrium position. The movable fitting 14 of the actuator of the invention illustrated in FIG. 2 is in this equilibrium position.

The coils 13 are arranged in the body 11 in accordance with a predetermined pitch, which is the same as the pitch of the magnets 15, that is to say that the total of the lengths of a coil 13 and the length of a space between two adjacent coils is equal to the total of the length of a magnet 15 and the length of a washer 20. It is thereby possible to define a succession of center planes P2 between two adjacent magnets 15 which extend substantially at the center of the washers 20 and which are perpendicular to the sliding axis X2. It may be noted that the pitch of the center planes P1 is equal to the pitch of the center planes P2.

Furthermore, in the equilibrium position illustrated here, it can be seen that each center plane P2 extends substantially in the region of one of the center planes P1 of a force generator.

Figure 3:
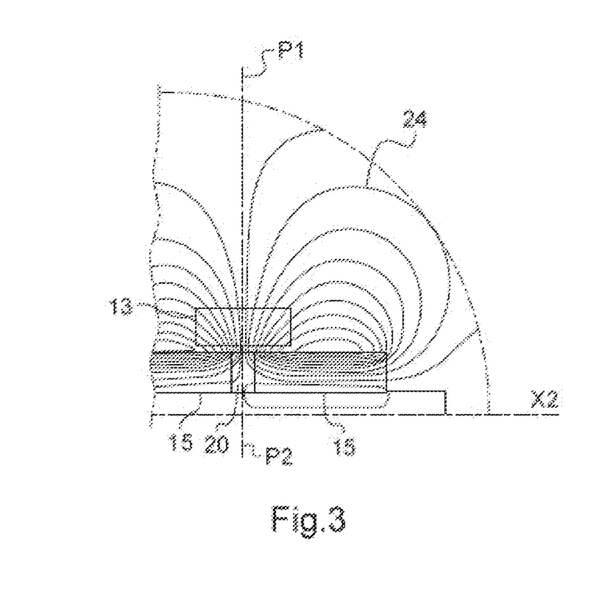
FIG. 3 is a schematic view of the magnetic field lines produced by two magnets of the actuator of the invention in the region of a conductive wire coil of the actuator of the invention.

FIG. 3 illustrates magnetic field lines 24 produced by two magnets 15 in the region of a coil 13 of the actuator of the invention, the movable fitting 14 being in the equilibrium position described above. The field lines 24 have been obtained for an optimized set of values b, L, e (here, b≈4 mm, L≈6 mm, e≈0.5 mm), where b is the length of a coil, L is the length of a magnet 15, and e is the length of a washer

20. The length d of the space between two adjacent coils is derived from the relationship d=L+e−b (here, d≈2.5 mm).

When they extend through the coil 13, the field lines 24 are substantially more parallel relative to each other than for the actuator of the prior art illustrated in FIG. 1 (that is to say that an angle between two tangents of two field lines 24 is closer to 0° than in FIG. 1), and a greater number of the field lines 24 extend radially in the region of the coils 13 (that is to say that a greater portion of the tangents of the field lines 24 are perpendicular to the center axis X2 when they extend through the coil). In this configuration, the maximum value of the intensity of the magnetic field produced in the region of the coil 13 is approximately 1.4 tesla, for neodymium magnets (NdFeB).

This field value is substantial and therefore leads to the production of Laplace forces identical to those of the prior art but for a weaker supply current. Alternatively, the same supply current gives rise to greater Laplace forces, therefore to vibrations having a greater amplitude.

It may be noted here that the Laplace forces which allow movement of the movable fitting in the sliding axis X2 are generated over the entire surface of the rectangular cross-section of the coil 13 illustrated in FIG. 3. All the windings of the coil cooperate in generating Laplace forces which are substantially parallel with the sliding axis X2 so that the whole of each coil 13 correctly constitutes a generator of magnetic force in the sliding axis of the movable fitting.

Generally, for actuators of the prior art having a size greater than the actuator of the invention, the return diaphragms are rubber disks which are cut by laser. The application of this solution to miniature actuators such as the one of the invention has the following disadvantages:
  the diaphragms must be sufficiently rigid to maintain the movable fitting 14 correctly, which involves producing them so as to have a given thickness, or using specific materials,
  the diaphragms may introduce distortions for linear movements having a great amplitude.

Figures 4, 5:
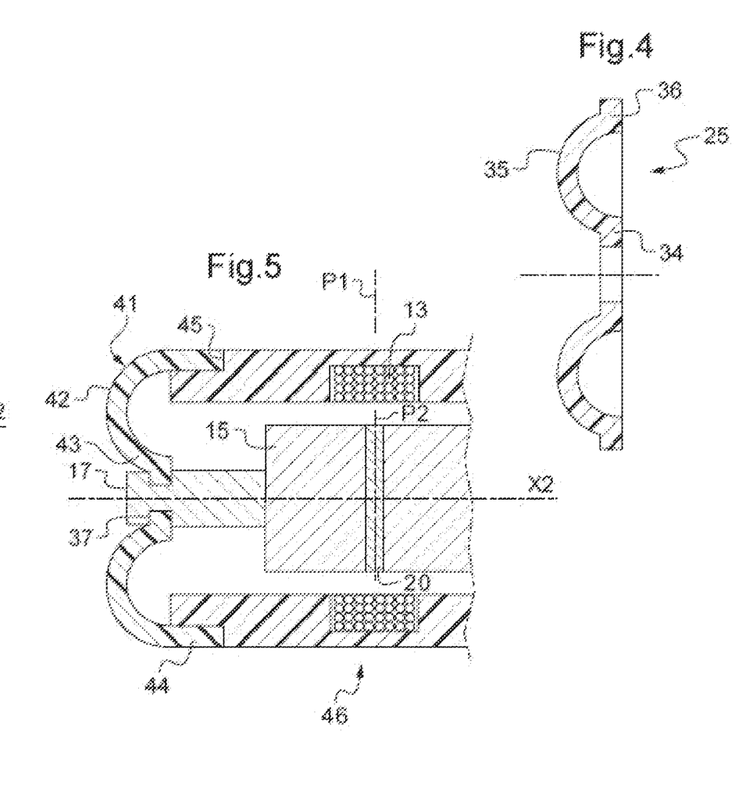
FIG. 4 is a cross-section of a first type of resilient diaphragm of the actuator of the invention.
FIG. 5 is a cross-section of a detail of the actuator of the invention comprising a second type of resilient diaphragm.

In order to overcome this disadvantage, resilient diaphragms 25 of a first type, which can be seen in FIG. 4, are produced from molded elastomer material in order to have a semi-toric cross-section 35, which allows the desired rigidity to be obtained, a great axial deformability allowing linear movement of great magnitude, under distortions which are substantially reduced.

The semi-toric portion 35 of the diaphragm 25 is surrounded by an internal bead 34 and an external bead 36. The internal bead 34 of each diaphragm is engaged in a groove 37 which is produced at the end 17 of the rod 19, while the external bead 36 is pressed against a shoulder 26 of the body 11 in such a manner that the resilient diaphragms 25 form return springs for the movable fitting 14 in the equilibrium position.

Resilient diaphragms 41 of a second type are illustrated in FIG. 5. They have a semi-toric cross-section 42 which is surrounded by an internal bead 43 and by an extension 44 of the semi-toric cross-section 42. The internal bead is engaged in the groove 37, while the extension 44 is pressed against a shoulder 45 of a body 46 of an actuator of the invention. The body 46 differs from the body 11 only as a result of the shape of the shoulder.

The body 1 of the actuator of the prior art illustrated in FIG. 1 has a material thickness f, around which the conductive wire forming the coils 3 is wound. According to the invention, however, the coils 13 are directly opposite the movable fitting 14 so that the only gap existing between the coils 13 and the movable fitting 14 is constituted by the sliding gap, which has the following main advantages:
  being able to reduce to a fraction of a millimeter the distance between the coils 13 and the magnets 15, which allows an increase in the intensity of the magnetic field in the region of the electrical coils 13 (and therefore the electromagnetic force leading to the vibrations generated by the actuator),
  reducing the mass of the actuator of the invention,
  reducing the complexity and the cost of the actuator of the invention.

In order to produce the actuator of the invention, there is provided a production method for this actuator, illustrated in FIGS. 6a, 6b, 6c, 6d and 6e.

Figures 6A, 6B, 6D:
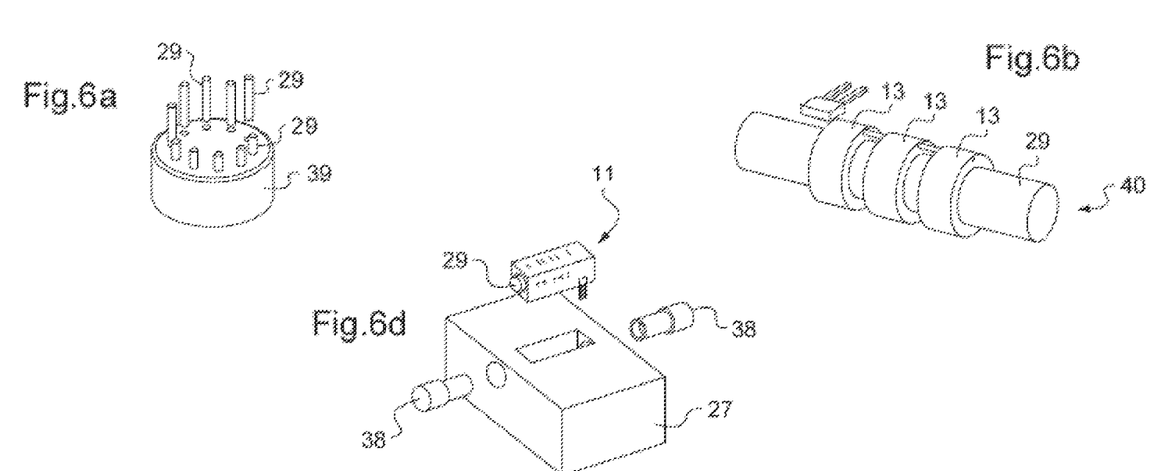
FIGS. 6a, 6b, 6c, 6d, 6e illustrate steps in the production of the actuator of the invention according to the production method of the invention.
Figure 6C:
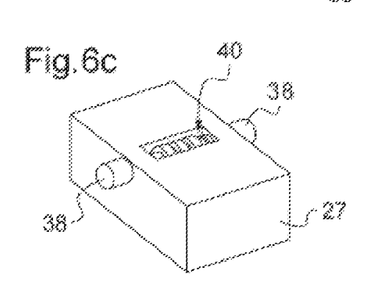
Figure 6E:
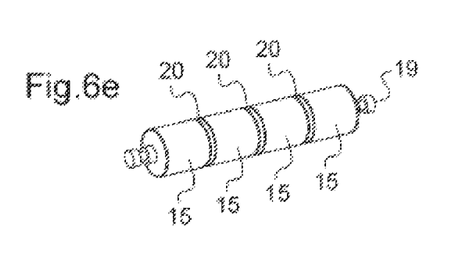

The production method for this actuator of the invention comprises the following steps:
  a step of producing cores 29, for example, from plaster, illustrated in FIG. 6a, which involves pouring liquid plaster into a first mold 39 of silicone, then removing the cores 29 after a drying time of a few minutes,
  a step of positioning the coils 13, which step is illustrated in FIG. 6b and during which the coils 13, which are advantageously prefabricated, are installed around a core 29 and electrically connected to each other, forming an assembly 40,
  a step of inserting the assembly 40 formed by the coils 13 and the core 29 in a second mold 27, which step is illustrated in FIG. 6c, the assembly 40 being fixed in position in the second mold 27 by means of two plugs 38,
  a step of injecting thermosetting resin in the second mold 27,
  a step during which the mold is brought to a given temperature allowing the resin to be hardened,
  a step of removing the plugs 38 then the body 11, which step is illustrated in FIG. 6d, the body 11 containing in this step the core 29,
  a step of destroying or removing the core 29,
  a step of producing the movable fitting 14 by positioning the permanent magnets 15 and the washers 20 around the rod 19, which step is illustrated in FIG. 6e,
  a step during which a first resilient diaphragm 25 is fitted to a first end 18 of the body 11, then the movable fitting 14 is inserted inside the body 11, then a second resilient diaphragm 25 is fitted to a second end 18 of the body 11.

Therefore, it is possible to obtain simply and at low cost an arrangement of the magnets 15 and the coils 13 corresponding to the equilibrium position described above, and a very small spacing between the coils 13 and the magnets 15 which may be limited to the strict minimum required in order to ensure a necessary play for the movement of the movable fitting 14 in the body 11.

According to a specific embodiment, the method of the invention comprises a step of integrating in the actuator, for example, electronic components, a miniature power amplifier or components which allow digital control of the actuator. Advantageously, those components will be embedded in the resin which, on the one hand, makes it easier to integrate those components and, on the other hand, limits mechanical constraints applied to those components when the actuator vibrates.

Figure 7:
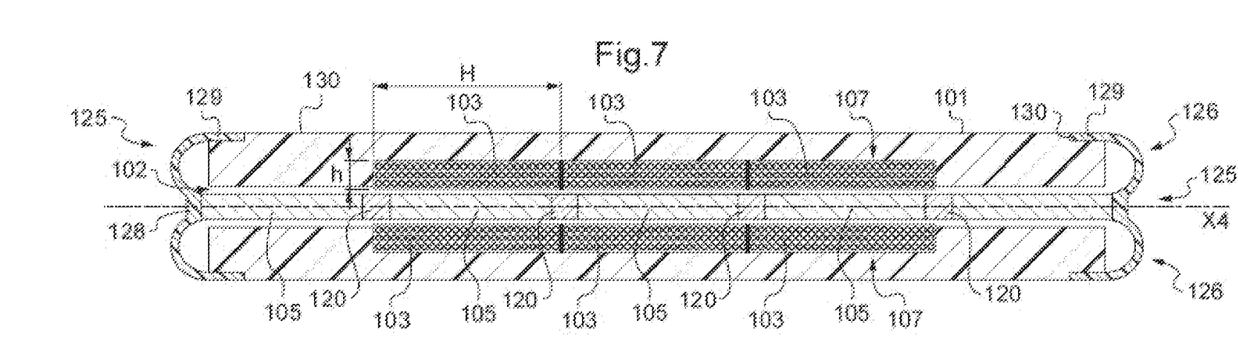
FIG. 7 is a cross-section of an actuator according to a second embodiment of the invention.
Figure 8:
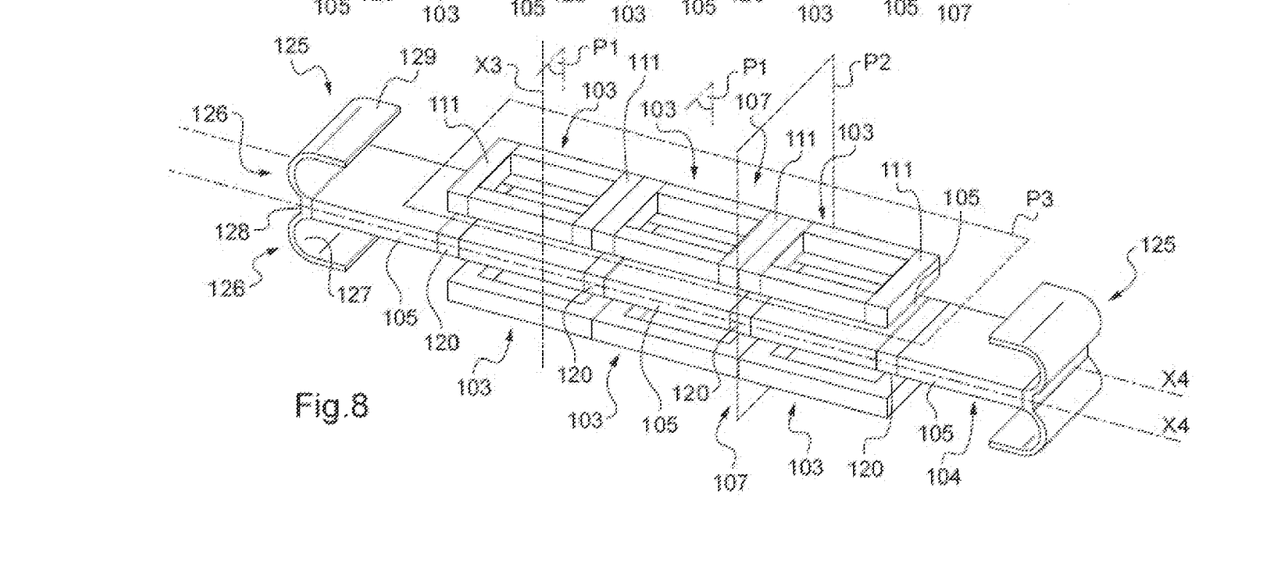
FIG. 8 is a perspective view of some elements of the actuator according to the second embodiment of the invention.

According to a second embodiment of the invention, the actuator comprises coils and magnets which are of non-circular form, of rectangular cross-section, for example. Such an actuator is illustrated in FIGS. 7 and 8.

The actuator comprises a body 101 which defines a cavity 102 having a rectangular cross-section. The body 101 comprises six coils 103 of conductive wire of substantially parallelepipedal, planar form, which means here that the height h of a coil 103 is far smaller than its width H. The six coils 103 are distributed in two groups 107 of three aligned coils. In each group 107, the coils 103 are adjacent and arranged in the same plane P3 (illustrated in FIG. 8 with broken lines) so that the main axes X3 thereof are perpendicular to that plane P3. The groups 107 extend so as to define two opposing faces of the cavity 102.

The actuator further comprises a parallelepipedal movable fitting 104 which is inserted with little play inside the cavity 102 in order to be able to slide inside it in a sliding direction X4. The movable fitting 104 is formed by five aligned planar, parallelepipedal permanent magnets 105. The magnets 105 are separated by bars 120 which are produced from magnetically permeable material. Two faces of two magnets 105 facing the same bar 120 have identical polarities (North-North or South-South). The coils 103 are arranged in the body 101 in accordance with a predetermined pitch which is the same as the pitch of the magnets 105.

The field lines, when they extend through the coils, are substantially parallel with the axis X3. In this instance, the force generators 111 are constituted by the portions of the coils 103 in which the conductive wire has strands which extend perpendicularly to the sliding axis X4. When two coils 103 are fixed together, the strands of the conductive wire portions of the two coils which extend near each other together form a magnetic force generator, the center plane P1 of which extends between the coils. For the end coils, the extreme portion thereof which is constituted by the conductive wire strands which extend perpendicularly to the sliding axis X4 forms by itself a magnetic force generator.

In an equilibrium position, which is illustrated in FIGS. 7 and 8, a center plane P2 between two adjacent magnets (here, P2, which is shown with broken lines in FIG. 8, is a center plane of a bar 120) coincides substantially with the plane P1 of a facing generator.

Since the polarities of two adjacent magnets are opposed (North-South and South-North, or South-North and North-South), it is preferable for the electrical conductors of two adjacent coils of the same element to be travelled through by a current of the opposite direction. This allows the production in the actuator of a Laplace force of uniform orientation.

Resilient diaphragms 125 of such an actuator are formed by two lobes 126 which have a semi-cylindrical cross-section 127 and which are separated by an intermediate element 128 which has a rectangular cross-section and which is fixed to a magnet 105. The lobes 126 comprise an extension 129 which is pressed against a shoulder 130 of the body 101.

It is possible to construct such an actuator with a mold similar to the one illustrated in FIGS. 6c and 6d, this time using a generally parallelepipedal core. Naturally, the coils are no longer fitted around the core but instead positioned on the surface thereof.

The invention is not limited to the specific embodiment which has been described above, but, conversely, includes any variant which falls within the scope of the invention as defined by the claims.

Although the actuator of the invention according to the first embodiment has been selectively illustrated so as to have four magnets and three coils, it is possible to use a different number of magnets and coils, the most advantageous configuration being to provide a number k of coils and a number k+1 of magnets, with k preferably being uneven.

Although the actuator of the invention according to the second embodiment has been selectively illustrated so as to have five magnets and six coils, it is possible to use a different number of magnets and coils, the most advantageous configuration being to provide a number k of magnets (k at least equal to three) and n of coils with n=2 k−4.

Similarly, although specific forms of diaphragms have been set out, other forms could be advantageous. It is thereby possible to provide, for example, a diaphragm provided with concentric, circular folds. It is also possible to provide a diaphragm which is open-worked by means of openings, preferably of helical form, in order to make the diaphragm resilient in the direction orthogonal to its plane.

The dimensions set out here for the coils, magnets and washers result from simulations which allow optimization of the dimensions for an actuator having a specific desired form and outer dimensions. It is naturally possible to modify those dimensions while remaining within the scope of the invention, particularly if the space provided for receiving the actuator is greater, or if a selection is made to use a different number of magnets or coils in the same space.

Furthermore, although the magnets have been selected so as to have identical dimensions, as have the coils, it is possible to use magnets and coils having different dimensions, but on the condition that each washer for separating the magnets is substantially in the region of an opposing center plane for generating loads in the equilibrium position.

The vibrotactile actuator therefore comprises an electric motor which is formed by a group of magnets and a group of coils, through which there extends an alternating electric current, and which is intended to drive a movable portion which is in this instance formed by the magnets and the rod. The actuator could comprise a plurality of motors which are mounted in "series", that is to say, comprising a plurality of groups of aligned magnets and a plurality of groups of aligned coils, through which separate alternating currents extend, each group of magnets cooperating with an associated group of coils. By those motors being synchronized, it is possible to increase substantially the levels of vibrations generated by the vibrotactile actuator. The actuator could also comprise a plurality of motors mounted "in parallel", forming a matrix of motors.

The invention claimed is:

1. A miniature linear vibrotactile actuator comprising:
   a first element of generally cylindrical form comprising permanent magnets which are aligned in such a manner that two adjacent faces of two adjacent magnets have identical polarities;
   a second element which defines a cylindrical cavity in which the first element is introduced with play in order to slide therein in a sliding direction, the second element comprising conductive wire coils having strands which extend perpendicularly to the sliding direction in order to form magnetic force generators and which are arranged to be in a state of electromagnetic influence with the first element;
   return and guiding means for the first element in a direction towards a position of equilibrium in the second element for which a center plane between two adjacent magnets substantially coincides with a center plane of a facing force generator; and
   wherein the return and guiding means are resilient diaphragms;

wherein the coils are located directly opposite the permanent magnets so that only a sliding gap is present between the coils and the permanent magnets; and wherein a portion of a cross-section of at least one resilient diaphragm is of a semi-toric form that is surrounded by an internal bead and an external bead, wherein the internal bead is engaged in a groove formed at an end of a rod of the first element and the external bead is engaged with a shoulder of the second element so that the at least one resilient diaphragm forms a return spring for biasing the first element to position of equilibrium, wherein the strands of the coils are located within annular cavities formed in the second element without intervening support structure between strands within each annular cavity, and wherein the annular cavities and the shoulder are part of a one-piece integral construction;

wherein, when viewed along the sliding direction, the external bead overlaps at least a portion of the strands of the conductive wire that extend perpendicularly to the sliding direction; and wherein an inner diameter portion of the cylindrical cavity of the second element, an inner diameter of the conductive wire coils, and an inner circumferential portion of the external bead of the of at least one resilient diaphragm are aligned.

2. The actuator as claimed in claim 1, wherein the permanent magnets and the coils are of substantially tubular form, the cavity has a circular cross-section, and the coils are arranged in order to surround the first element.

3. The actuator as claimed in claim 1, wherein the permanent magnets and the coils are of substantially parallelepipedal planar form and extend in parallel planes, the cavity has a rectangular cross-section, and the coils are arranged in two groups which define two opposing faces of the cavity.

4. The actuator as claimed in claim 1, wherein the permanent magnets are separated by elements of a magnetically permeable or soft ferromagnetic material.

5. The actuator as claimed in claim 1, wherein at least one resilient diaphragm is open-worked.

6. The actuator as claimed in claim 1, configured as a haptic interface for information transmitted by a machine that generates an electrical signal received by the actuator.

7. The actuator as claimed in claim 1, wherein a resiliency of the diaphragms applies sufficient force to return the first element to the position of equilibrium after the first element has been displaced and power is no longer supplied from the coils.

8. The actuator as claimed in claim 1, wherein a portion of a cross-section of another one of the resilient diaphragms has a cross-section that is of a semi-toric form that is surrounded by a second internal bead and as second external bead, wherein the second internal bead is engaged in a respective groove formed at another end of the rod of the first element and the second external bead is engaged with another shoulder of the second element so as to bias the first element to the position of equilibrium.

9. The actuator as claimed in claim 1, wherein the at least one resilient diaphragm is inserted inside a recess formed on one side of the second element so that the at least one resilient diaphragm does not protrude beyond a distal end of the second element at the one side in which the diaphragm is inserted.

10. A production method for an actuator as claimed in claim 1, comprising at least:
a step of positioning the conductive wire coils on a core,
a step of inserting the coils and the core in a mold,
a step of injecting a material into the mold,
a step of hardening the material,
a step of removing the second element which is formed by a portion of the hardened material and which comprises the coils,
a step of destroying or removing the core,
step of inserting the first element inside the second element.

11. The production method as claimed in claim 10, particularly suitable for the production of an actuator in which the permanent magnets and the coils are of substantially tubular form, the cavity has a circular cross-section and the coils are arranged in order to surround the first element,
characterized in that, in the positioning step, the coils are fitted around the core.

12. The production method as claimed in claim 10, particularly suitable for the production of an actuator in which the permanent magnets and the coils are of substantially parallelepipedal, planar form and extend in parallel planes, the cavity has a rectangular cross-section and the coils are arranged in two groups which define two opposing faces of the cavity,
characterized in that, in the positioning step, the coils are positioned on the surface of the core.

13. A miniature linear vibrotactile actuator comprising:
a first element of generally cylindrical form comprising permanent magnets which are aligned in such a manner that two adjacent faces of two adjacent magnets have identical polarities;
a second element which defines a cylindrical cavity in which the first element is introduced with play in order to slide therein in a sliding direction, the second element comprising conductive wire coils having strands which extend perpendicularly to the sliding direction in order to form magnetic force generators and which are arranged to be in a state of electromagnetic influence with the first element;
return and guiding means for the first element in a direction towards a position of equilibrium in the second element for which a center plane between two adjacent magnets substantially coincides with a center plane of a facing force generator; and
wherein the return and guiding means are resilient diaphragms;
wherein the coils are located directly opposite the permanent magnets so that only a sliding gap is present between the coils and the permanent magnets; and
wherein a portion of a cross-section of at least one resilient diaphragm is of a semi-toric form that is surrounded by an internal bead and an external bead, wherein the internal bead is engaged in a groove formed at an end of a rod of the first element and the external bead is engaged with a shoulder of the second element so that the at least one resilient diaphragm forms a return spring for biasing the first element to position of equilibrium; wherein the strands of the coils are located within annular cavities formed in the second element without intervening support structure between strands within each annular cavity, and wherein the annular cavities and the shoulder are part of a one-piece integral construction;
wherein the shoulder forms a flat bottom portion of a counterbored hole at an end of the cylindrical cavity; and wherein an inner diameter portion of the cylindrical cavity of the second element, an inner diameter of the conductive wire coils, and an inner circumferential portion of the external bead of the of at least one resilient diaphragm are aligned.

14. The actuator as claimed in claim 13, wherein, when viewed along the sliding direction, the external bead overlaps at least a portion of the strands of the conductive wire that extend perpendicularly sliding direction.

15. The actuator as claimed in claim 13, wherein the at least one resilient diaphragm is inserted inside a recess formed on one side of the second element so that the at least one resilient diaphragm does not protrude beyond a distal end of the second element at the one side in which the diaphragm is inserted.

16. A miniature linear vibrotactile actuator comprising:
   a first element of generally cylindrical form comprising permanent magnets which are aligned in such a manner that two adjacent faces of two adjacent magnets have identical polarities;
   a second element which defines a cylindrical cavity in which the first element is introduced with play in order to slide therein in a sliding direction, the second element comprising conductive wire coils having strands which extend perpendicularly to the sliding direction in order to form magnetic force generators and which are arranged to be in a state of electromagnetic influence with the first element;
   return and guiding means for the first element in a direction towards a position of equilibrium in the second element for which a center plane between two adjacent magnets substantially coincides with a center plane of a facing force generator; and
   wherein the return and guiding means are resilient diaphragms;
   wherein the coils are located directly opposite the permanent magnets so that only a sliding gap is present between the coils and the permanent magnets; and
   wherein a portion of a cross-section of at least one resilient diaphragm is of a semi-toric form that is surrounded by an internal bead and an external bead, wherein the internal bead is engaged in a groove formed at an end of a rod of the first element and the external bead is engaged with a shoulder of the second element so that the at least one resilient diaphragm forms a return spring for biasing the first element to position of equilibrium; wherein the strands of the coils are located within annular cavities formed in the second element without intervening support structure between strands within each annular cavity, and wherein the annular cavities and the shoulder are part of a one-piece integral construction;
   wherein the at least one resilient diaphragm is inserted inside a recess formed one side of the second element so that the at least one resilient diaphragm does not protrude beyond a distal end of the second element at the one side in which the diaphragm is inserted; and
   wherein an inner diameter portion of the cylindrical cavity of the second element, an inner diameter of the conductive wire coils, and an inner circumferential portion of the external bead of the of at least one resilient diaphragm are aligned.

* * * * *